324-77

CROSS REFERENCE SEARCH ROOM

MULTIPLE CODE DELAY LINE CORRELATOR

Filed Oct. 20, 1965

INVENTOR.
HARPER J. WHITEHOUSE
GEORGE F. LINDSAY
BY
V. C. Muller
ATTORNEY.

United States Patent Office 3,458,694
Patented July 29, 1969

3,458,694

MULTIPLE CODE DELAY LINE CORRELATOR

Harper J. Whitehouse, Hacienda Heights, and George F. Lindsay, Pasadena, Calif., assignors to the United States of America as represented by the Secretary of the Navy Filed Oct. 20, 1965, Ser. No. 499,111
Int. Cl. G06g 7/19; G06f 15/34
U.S. Cl. 235—181 8 Claims

ABSTRACT OF THE DISCLOSURE

A torsional delay line signal processing device, which is also a matched filter, comprising an elongated element or wire of magnetoelastic material located in a magnetic field, at various points along whose length are inductively coupled a plurality of discrete interaction tap stations. Each tap station includes a core inductively coupled by a loop of wire to an electrical signal caused by a torsional wave traversing the wire. All cores are in a plane which includes the axis of the wire and may be staggered in such a manner that the spacing between the loops of wire is limited only by the diameter of the wire forming the loops. The resultant close spacing permits using the delay line even when the pulse rate is as great as six megabits per second. By looping an output wire through a particular core more than once, the magnitude of the output signal at that particular station is a multiple of the magnitude at a station whose core is looped only once.

The invention described herein may be manufactured and used by or for the Government of the United States of America for governmental purposes without the payment of any royalties thereon or therefor.

The invention relates to novel and improved basic construction of a torsional delay line matched filter communication device of the type disclosed in the copending application, Ser. No. 333,241, now Patent No. 3,290,649, entitled "Delay Line Signal Detector," filed Dec. 24, 1963.

In the type of device referred to, a torsional stress impulse wave interacts with a plurality of discrete inductive interaction stations disposed in spaced relation along the delay line. These inductive interaction stations selectively produce one or the other of opposite polarity induced voltages for a given sense of delay line impulse, and are arranged in the direction of wave propagation in a sequential order of disposition which is the reverse of the corresponding sequential order of sense of impulse in time of the impulse wave which the device is to detect. Thus, the device has an impulse response which is backward in time to the impulse wave characteristics of the signal it is to detect, which is the criterion for a matched filter. The current importance of matched filter communication devices, and particularly in connection with problems of processing signals in noisy communication channels has been disclosed in the recent publication, "An Introduction to Matched Filters," George L. Turin IRE Transactions on Information Theory, June 1960, p. 311.

The apparatus described in the above cited copending application is satisfactory for many applications. However, certain proposed developments in echo ranging require concurrent searching of the returning signal for a large number of different long binary sequence coded signals, representing the different Doppler conditions. With the latter prior art apparatus, this can only be achieved by operation of a number of the apparatuses in parallel, resulting in bulky and complex equipment, and the expense of a large number of components. Another known attempt to achieve such multiple code detection is described in "A Matched Filter Detection System for Complicated Doppler Shifted Signals," Robert M. Lerner, IRE Transactions on Information Theory, June 1960, p. 373. Although the latter attempt employs only a single delay line, it requires a great multiplicity of resistor components, and requires their connection in an elaborate mesh of conductors, so that the measure of saving and simplicity achieved by this approach is limited.

Another disadvantage of the prior art apparatuses disclosed in the cited copending application is that the physical space required for forming each inductive interaction station by means of a U-shaped permanent magnet limits the frequency at which elemental components of the signals may be processed. For example, using the smallest convenient permanent magnet structure with a typical high quality commercial delay line, the apparatus disclosed in the copending application can only handle signal frequencies of one megabit per second, or less.

Further, prior to the present invention it was not considered practical to construct a torsional delay line type matched filter in which the individual impulse components are weighted in magnitude as well as in sense of impulse variation. As a result, such devices have been heretofore regarded as limited to the processing of signal forms having only two levels of quantization. On the other hand, the theory of matched filter signal processing is not bounded by any such limitation, and it is only the lack of convenient apparatuses which has heretofore prevented processing of signals having more than two levels of quantization, or the processing of an analog form of signals by discrete approximation of its impulse form using multiple levels of quantization.

Recognizing the foregoing status of the prior art and seeking to advance same, the objectives of the present invention include:

(1) Provision of a simple torsional delay line matched filter communication device of the type employing interaction between a torsional stress impulse wave and a plurality of discrete inductive interaction stations in spaced relation along the line, which is capable of simultaneous on-line processing of the signal to detect any of a plurality of different impulse signal codes.

(2) Provision of an improved basic construction of a torsional delay line matched filter communication device of the type employing interaction between a torsional stress impulse wave and a plurality of discrete inductive interaction stations in spaced relation along the line, which is capable of processing higher bit rates of serial binary signals than heretofore possible in the prior art.

(3) Provision of an improved basic construction of a torsional delay line matched filter communication device of the type employing interaction between a torsional stress impulse wave and a plurality of discrete inductive interaction stations in spaced relation along the line, which may be simply and conveniently adapted to synthesize impulse responses for impulse signals having in excess of two levels of quantization.

Other objects, advantages and novel features of the invention will become apparent from the following detailed description of the invention when considered in conjunction with the accompanying drawings wherein.

Figure 1:
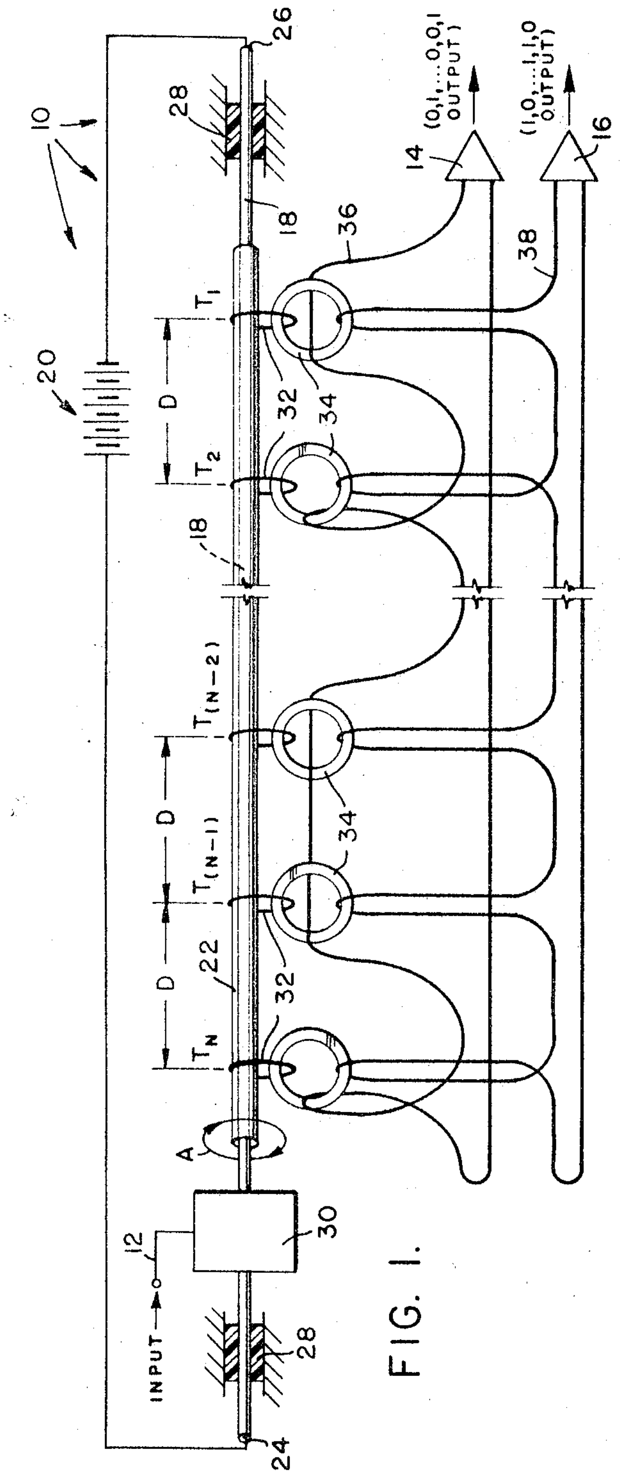
FIG. 1 is a schematic of a torsional delay line device embodying the present invention.

Referring now to the drawing, and in particular to FIG. 1, a torsional delay line matched filter type signal processing device 10 is illustrated in a form adapted for "on-line" detection of lengthy binary pulse coded signals. Reference is made to the above cited patent for a more full explanation of on-line signal detection by the torsional delay line matched filter approach. Particular attention is invited to the sentence starting at line 5 of column 8 thereof, where the essential nature of a torsional delay line matched filter type detector is set forth. The present invention is an improvement over the device of that copending application, capable of selectively detecting any one of a plurality of different signal codes. For sake of brevity the embodiment described herein is limited to the detection of only two different binary sequence codes, both in the form of a serial binary impulse wave signal and of predetermined bit rate. It is to be understood that the principles of the invention are equally applicable to larger pluralities of binary sequences. The first binary sequence code which the embodiment is adapted to detect is a sequence of binary digits in which the first two and last three digits are 0, 1 . . . 0, 0, 1. Typically, the total sequence is in excess of one hundred digits, the intermediate digits being omitted for sake of brevity. The other sequence code which the embodiment is adapted to detect is 1, 0 . . . 1, 1, 0. As is conventional in art of serial binary pulse code communication in noisy mediums, these sequences of binary digits are chosen to be of a predetermined type having desired inherent properties making it possible to detect same with a high degree of discrimination of noise, or different sequence codes. The bit rate of the serial binary impulse wave is typically in the range 500 kilobits per second to three megabits per second.

The signal channel within which it is desired to detect these sequence codes is connected to an input lead 12 of device 10. Detection of the 0, 1 . . . 0, 0, 1 signal is indicated by an output channel comprising output amplifier 14, and detection of the 1, 0 . . . 1, 1, 0, signal is indicated by an output channel comprising output amplifier 16. The serial code input signal is preferably preprocessed to place same in a form (if not already in such form) in which the binary signal intelligence is in a band pass centered about a frequency corresponding to the bit rate of the serial signal. One technique of transforming a straight two level serial binary signal into this preferred type of signal is the so-called "Manchester code" which is illustrated in the cited copending application.

Device 10 comprises a delay line wire 18 of magnetoelastic material. A voltage source 20 is series connected with wire 18, producing a quiescent circular flux field both within and about the wire along its full length, in the direction of arrow A. A sleeve 22, made of insulating material, and illustrated in the drawing as transparent plastic tubing, covers substantially the entire span of the delay line wire 18. The bore of sleeve 22 forms a loose fit about the delay line so that acoustic wave propagation along the length of the delay line wire is essentially not affected by the presence of the sleeve. One end of the delay line is designated its input end 24, and the other is designated its terminal end 26. Absorptive structure 28 are coupled to the line adjacent both of its ends to prevent acoustic reflections. An electro-acoustic wave transducer 30 for converting an electrical signal to a torsional acoustic wave forms the input of device 10 and is coupled to the line adjacent to its input end. Transducer 30 may be of any conventional type. One conventional type of transducer operates in cooperation with the concentric flux field produced voltage source 20, by way of employing a winding of wire about the delay line as the means for generating the mechanical stress in the delay line wire. The winding may be a single turn or multi-turn. The interaction of an electrical signal through this coupling winding with the concentric field introduces a torsional stress wave along the delay line by what is commonly referred to as the Wiedemann effect. Another conventional type of transducer, which does not involve cooperation with the quiescent flux field, employed a pair of magneto-strictive torquing ribbons attached at diametrically opposite points about the delay line circumference. The ribbons are excited by the electrical signal in such a manner that the input signal produced a torque couple. The quiescent concentric magnetic field may, alternatively, be produced by permanently magnetizing wire 18 if it is magnetically remanent.

A sequence of $n$ inductive delay line tap station, $T_1$, $T_2$ . . . $T_{(n-2)}$, $T_{(n-1)}$, $T_n$, are disposed in space relationship along wire 18, between its ends. It is to be appreciated that FIG. 2, as well as being enlarged and diagrammatic, depicts only short fragmentary portions of the total delay line span and depicts only a few of the very large number of tap stations of the sequence. The inductive tap stations are designated in sequential order of their disposition in the direction from terminal end 26 of the delay line to input end 24 (i.e. from right to left as one looks at the drawing). It is significant to note that this direction is opposite to the direction of propagation of a wave launched from transducer 30 at the input end 24. Inductive tap stations $T_1$ . . . $T_N$ are uniformly spaced apart along the length of the delay line by the bit spacing of the elemental binary impulse components of the serial binary code signals to be detected. This spacing may be conveniently calculated for the acoustic wave propagation velocity of the delay line. For example, in an embodiment employing a typical commercial delay line having an acousitc wave propagation velocity $V_c=0.112$ inch per microsecond, the correct spacing of inductive stations for detection of a serial binary coded signal having a bit rate of one megabit per second is 0.112 inch. Each inductive tap station consists of both a single turn loop 32 of a wire conductor linking the delay line wire 18 and a conventional linear ferrite core 34, also linked by the single turn loop. Winding 32 is folded about sleeve 22 in a manner in which it is in contact with the sleeve over approximately one-half of its circumferential periphery. This serves to place the fold in the region of highest intensity of the quiescent concentric flux field. Two coding wires, 36 and 38, are individually threaded through apertures of the ferrite cores 34 at all the inductive stations T. Coding wire 36 and output amplifier 14 together form the output channel for indicating detection of the 0, 1 . . . 0, 0, 1, signal, and this is determined by relative direction in which the wire is threaded through the apertures of the individual ferrite cores. In the embodiment illustrated in FIG. 1, the direction of threading through a core aperture in which the wire appears to enter the plane of the paper, from left to right, represents a "0" binary digit. Wire 36 is threaded through the transformer passes through the aperture in the direction appearing to emerge from the plane of the paper represent a "1" binary digit. Wire 36 is threaded through the transformer cores of inductive tap sequence $T_1$, $T_2$ . . . $T_{(N-2)}$, $T_{(N-1)}$, $T_N$, in the selected one or the other of the two directions of threading, representing "0" and "1" digits in accordance with the digits of the sequence 0, 1, . . . 0, 0, 1. Thus, wire 36 passes through the core of inductive station $T_1$ in the direction entering the plane of the paper, through that of station $T_2$ in the direction emerging from the plane of the paper, etc. The ends are returned to the input side of output amplifier 14. In an analogous manner, coding wire 38 and amplifier 16 together form the output channel for indicating the detection of the 1, 0 . . . 1, 1, 0 signal, and wire 38 is threaded through the ferrite cores in accordance with the code sequence.

In operation, the individual loops 32 of sequence of tap stations $T_1$ . . . $T_n$ each act as an inductive pickoff in which is induced a voltage of a sense of polarity and magnitude in accordance with the sense and magnitude of the induction producing flux variation caused by travel of a torsional impulse through a section of the delay line adjacent to the tap station. This inductive phenomenon involves interaction of the torsional stress wave, the circular concentric flux produced by voltage source 20, and the individual loops 32, and is the inverse of the previously referred to Wiedemann effect. Such inductive pickoff action takes place individually at all the loops 32, and from there is coupled to the associated individual transformer cores. For purposes of the present explanation, it is to be assumed that the transformer coupling action between the ferrite cores and code wire 36 is such that transformer coupling takes place without voltage polarity inversion at stations where the code wire is threaded through a core aperture in the direction appearing to enter the plane of the drawing from left to right, and with polarity inversion at stations where the wire is threaded through the core aperture in the opposite direction. The signal induced into the inductive pickup loops 32 of those tap stations representing a "0" bit are therefore transformer coupled into code wire 36 without inversion, and the signals induced in the loop 32 of tap stations representing a "1" bit are coupled into the code wire with polarity inversion. Since elemental induced voltages from all the taps stations are simultaneously coupled into code wire 36, induced voltage components of opposite polarities tend to buck one another. The code wire 36 therefore effectively serves as parallel input, single output, polarity encoding network for detection of the presence of the sequence 0, 1 . . . 0, 0, 1 at its parallel input. In accordance with the conventional principles of communication systems employing codes of predetermined discrimination enhancing sequences, the output of such a polarity encoding network will be greatest only when its own predetermined binary sequence code is present at its input.

Assume then that a signal of the predetermined bit rate corresponding to the tap station spacing D, and representing the 0, 1 . . . 0, 0, 1 code is launched along delay line 18 through transducer 30. The signal will form a traveling wave having its elemental binary components, representing individual bits of the binary code, spaced by the distance D. The impulse component representing the first binary number in the sequence will be at the lead end of the traveling wave in the direction of its propagation from the launcher 30 toward terminal end 26 of the delay line. When the traveling wave reaches a position in which its sequential binary impulse components travel across the corresponding sequential inductive taps, corresponding inductive responses will be coupled into the pickup loops 32. The elementary binary components representing "0" and "1" bits, respectively, will coact with the tap stations to produce opposite instantaneous senses of induced voltage in the pickoff loops. Thus the impulse induced into the individual pickoff loops will be of polarities matching the polarity coding network action of coding wire 36, and the impulse component of each of the tap stations will be summed by the code wire, and amplified by amplifier 14. This provides an output signal of a duration commensurate with the bit period of the input signal as an indicator of detection of each of the impulses whose totality comprise the 0, 1 . . . 0, 0, 1 signal by device 10. The waveform of the output signal is dependent upon the form of the binary impulse signal wave in the input and typically will not resemble the signal wave of the individual binary bit component of the serial input signal, because of differentiating properties of the transducing actions involved in operation of device 10, and because of band pass limitations of the various components the signal passes through. Due to the fact that the sequence of input pulses may consist of any combination of positive and negative pulses, it is difficult to make a general statement about the form of the overall output signal, except that the amplitude of the output signal, barring unusual noise conditions, will have a greater amplitude when the entire pulse sequence matches the coding of the tap stations than when less than the entire pulse sequence matches the coding of the tap stations. An input containing a 1, 0 . . . 1, 1, 0 serial binary sequence signal would, through the agency of code wire 38, result in the appearance of an output pulse indicating detection of that signal at the output of amplifier 16.

Figure 2:
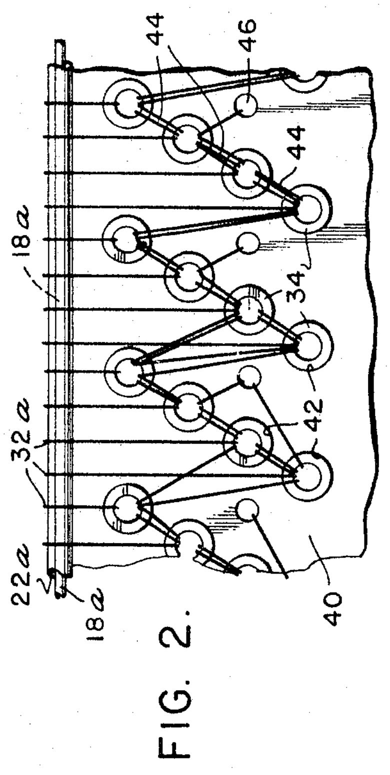
FIG. 2 is a fragmentary side elevation of one form of construction of the device of FIG. 1.

FIG. 2 shows an effective way of supporting device 12. The delay line 18*a*, surrounded by insulation sleeve 22*a*, is disposed adjacent a frame 40 of thin aluminum plate, or other non-magnetic material. The ferrite cores 34 are bonded in place in holes 42, drilled to receive them. The holes are arranged in laterally staggered sets of four to permit close spacing of the ferrite cores in the longitudinal direction of the delay line. Individual loops of conducting wire 32*a*, disposed in a perpendicular direction to the straight edge of the frame 40, link each core and the delay line wire. Any plurality of coding wires, aggregatively designated by the reference numeral 44, are threaded through the apertures of the ferrite cores. Each code wire of the plurality 44 is passed through a ferrite core in a direction of threading in accordance with the code sequence to be detected. An additional opening 46 having no core is provided for each set of four laterally staggered openings for use in permitting the wire to be passed to the other side, where necessary to achieve the proper coding.

Figure 3:
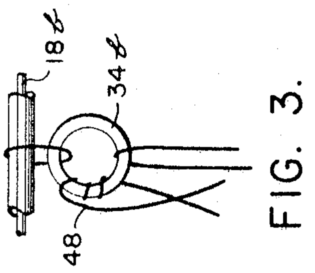
FIG. 3 illustrates a modified form of invention.

FIG. 3, which is in diagrammatic form like FIG. 1, illustrates a modification of invention in which a scaling of the inductive response is achieved at a particular station by providing a number of turns of the coding wire 48 about the ferrite core 34*b*. It will be readily appreciated that this modification permit synthesizing device 10's impulse response characteristics for multiple level quantized impulse wave signals, and even permits discrete approximations of analog impulse wave signals.

Although device 10 has been described for use in detection of a signal, it will be appreciated that it can also be employed to generate a coded signal by energizing a one of its coding wires with an impulse, and employing the electrical signal coupling side of transducer 30 as an output.

Obviously many modifications and variations of the present invention are possible in the light of the above teachings. It is therefore to be understood that the invention may be practiced otherwise than as specifically described.

What is claimed is:

1. In a torsional delay line type matched filter signal processing device, capable of transducing electrical signals into torsional stress waves, or torsional stress waves into electrical signals, the combination comprising:

a torsional mode delay line of magneto-elastic metal;

a flux source means for providing a quiescent circular flux field along the length of the delay line;

an electro-torsional acoustic stress wave transducer, operatively connected to the delay line at a first end thereof, having an electrical signal coupling means and a torsional stress coupling means;

a plurality of inductive tap stations disposed in predetermined spaced relationship along the length of the delay line, the spacing depending upon the torsional stress wave propagation velocity in the delay line and the bit rate of the input signal, said tap stations each comprising a loop of wire conductor linking both the delay line and an individual closed loop transformer core, said wire conductor linking the delay line in a manner in which it is disposed in an inductive coupling relationship with the quiescent field about the delay line;

a first coding circuit inductively coupled with said plurality of tap stations to form with each tap station one of two selective coupling connections to the delay line for providing an electrical signal wave-torsion stress wave transformation for a first predetermined coded input impulse wave signal in which the wave signal varies between opposite senses of impulse variation and having a total signal characteristic represented by a predetermined sequence of impulses, each impulse having a predetermined one or the other of opposite senses of impulse variation, said first coded input impulse wave signal forming an acoustical stress-traveling wave for propagation along the delay line occupying a section of the length co-extensive with said plurality of the tap stations, said coding circuit comprising a conductor threaded in series through the aperture of the closed loop transformer core at each inductive tap station in either of two selectively opposite directions of passing through the aperture of the core in accordance with the sense of variation of each impulse of the sequence of impulses forming the coded input impulse wave signal when launched along the delay line from one end thereof, the sequential positional order of the two selectively opposite directions of passage of the conductor through the transformer core apertures of the set of stations in the direction away from one end of the delay line being the reverse of the sequential time order of the corresponding parts of the first coded input impulse wave signal, when the first coded input signal is impressed at the same one end of the delay line.

2. Combination in accordance with claim 1, and a second coding circuit like the first coding circuit except that its conductor is selectively threaded through the apertures of the transformer cores of the inductive tap stations in directions to provide an electrical signal wave-torsional stress wave transformation for a second such predetermined coded input impulse wave signal having a different total signal characteristic.

3. A combination as in claim 2 wherein:

the individual closed loop transformer cores lie in a plane coincident with the axis of the delay line and are staggered in a manner to permit close spacing of the loop conductors.

4. A combination as in claim 3 wherein:

the conductor threading through the apertures of the closed loop transformer cores loops at least one of the cores more than once.

5. A combination as in claim 2 wherein:

the conductor threading through the apertures of the closed loop transformer cores loops at least one of the cores more than once.

6. A combination as in claim 1 wherein:

the individual closed loop transformer cores lie in a plane coincident with the axis of the delay line and are staggered in a manner to permit close spacing of the loop conductors.

7. A combination as in claim 6 wherein:

the conductor threading through the apertures of the closed loop transformer cores loops at least one of the cores more than once.

8. A combination as in claim 1 wherein:

the conductor threading through the apertures of the closed loop transformer cores loops at least one of the cores more than once.

References Cited

UNITED STATES PATENTS 3,069,664 12/1962 Adams et al. -------- 340—174
3,261,002 7/1966 Edmunds ----------- 340—174

MALCOLM A. MORRISON, Primary Examiner

F. D. GRUBER, Assistant Examiner

U.S. Cl. X.R.

324—77; 333—29, 30, 78; 340—174